Dec. 2, 1941.          C. C. LEVY          2,264,704
ELECTRODE CONTROL SYSTEM
Filed Jan. 5, 1940
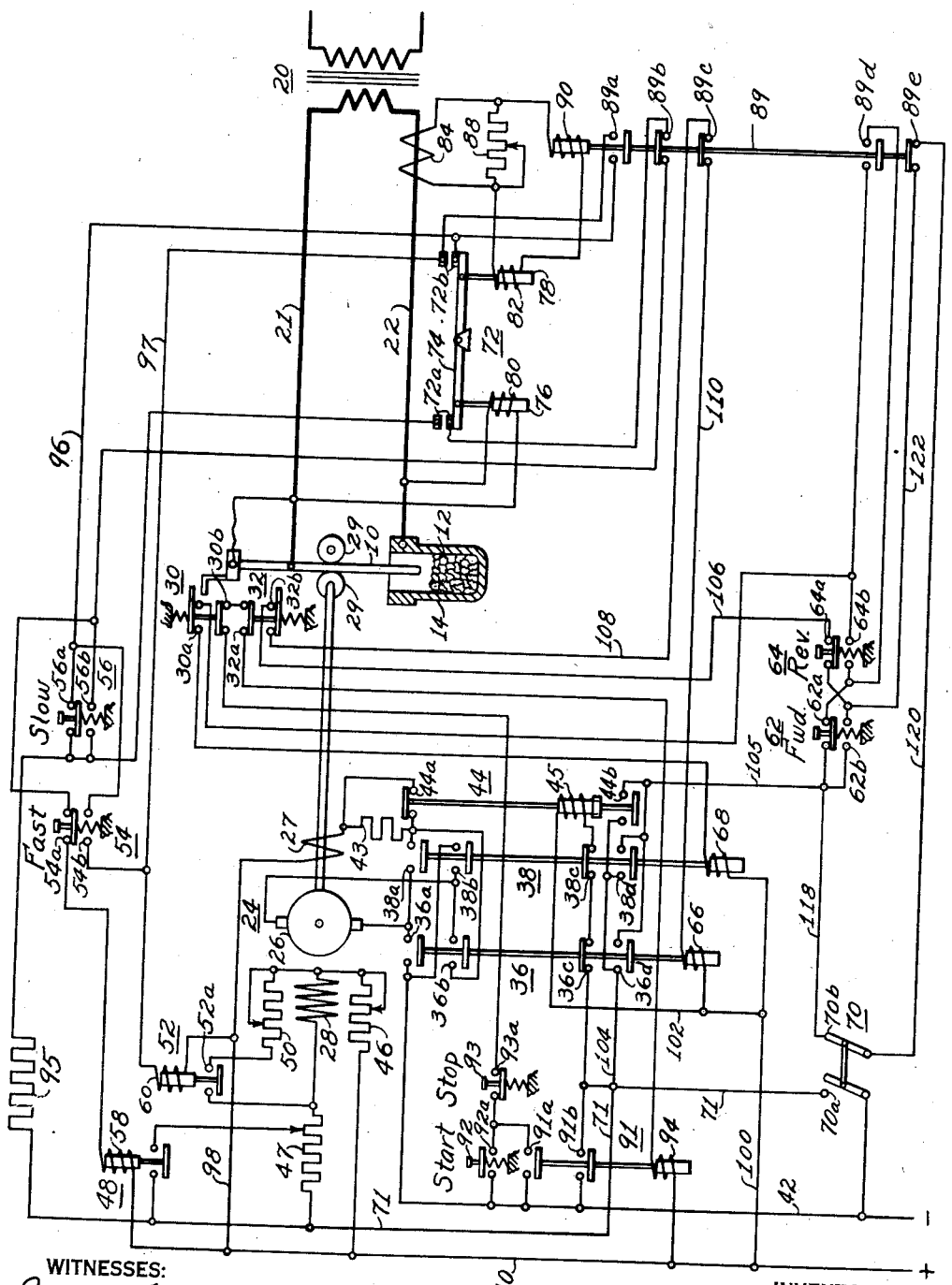
WITNESSES:
James H. Young
G.V. Tiolma
INVENTOR
Cyril C. Levy.
BY
Crawford
ATTORNEY Patented Dec. 2, 1941

2,264,704

UNITED STATES PATENT OFFICE 2,264,704

ELECTRODE CONTROL SYSTEM

Cyril C. Levy, Pittsburgh, Pa., assignor to Westinghouse Electric & Manufacturing Company, East Pittsburgh, Pa., a corporation of Pennsylvania Application January 5, 1940, Serial No. 312,534

8 Claims. (Cl. 13—13)

My invention relates, generally, to control systems, and it has reference, in particular, to movable electrode control systems.

It is an object of my invention, generally stated, to provide in a simple and effective manner for controlling the movement of a movable electrode so as to maintain predetermined arc conditions.

More specifically, it is an object of my invention to control the movement of an electrode in accordance with current and voltage conditions of an arc produced by the electrode, and provide for reversing the direction of movement of the electrode in accordance with predetermined current conditions in the electrode circuit.

Another object of my invention is to provide for normally feeding a movable electrode at a predetermined rate and selectively increasing or decreasing the rate of feed in accordance with conditions in the electrode circuit.

A further object of the invention is to provide an electrode control system which is sensitive to slight changes in the arc conditions.

Yet another object of my invention is to provide a simple and inexpensive control for a movable electrode which may be readily and economically manufactured and maintained.

Other objects will, in part, be obvious, and will, in part, appear hereinafter.

In practicing my invention, a movable electrode for maintaining an arc in an electric furnace, a welding process, or other similar operation, may be provided with reversible actuating means of any suitable nature, and may be connected to a source of energy by a suitable electrode circuit. The operation of the actuating means may be controlled by regulating means responsive both to current and voltage conditions of the electrode circuit, so as to vary the rate of feed of the electrode in accordance with variations in the conditions of an arc produced by the electrode. The direction of electrode feed may be controlled so as to normally provide for feeding the electrode under the control of the regulating means in one direction, and reverse the direction of electrode feed when the current in the electrode circuit exceeds a predetermined value. Manual control means may also be provided for controlling the operation of the actuating means under the operator's control when desired, so as to vary both the rate and direction of electrode feed.

For a more complete understanding of the nature and scope of my invention, reference may be had to the following detailed description and the single figure of the drawing, which illustrates diagrammatically a movable electrode system embodying the principal features of my invention.

Referring particularly to the drawing, the reference numeral 10 may denote a movable electrode which is to be actuated so as to strike and maintain an arc for any desired purpose, such as, for example, in connection with the work 12 which may comprise a material to be melted in the cupola 14 of an electric furnace.

Electrical energy may be supplied from any suitable source by means of an electrode circuit which includes a transformer 20, the terminals of which may be connected to the electrode 10 and the work 12 through the cupola 14, by the conductors 21 and 22, respectively.

In order to provide for feeding the electrode 10 to produce and maintain an arc with the work 12, suitable actuating or feeding means comprising a motor 24 having an armature 26, a series field winding 27 and a shunt field winding 28, may be utilized, the armature 26 being connected in driving relation to the feed rolls 29. Suitable means such as the limit switches 30 and 32, disposed to be actuated upon predetermined movement of the electrode 10, may be provided in connection with the electrode feeding means for controlling the operation of the feed motor 24 to prevent over-travel of the electrode at either the upper or lower end of a feeding operation.

In order to control the direction of electrode feed, suitable means such as the switches 36 and 38 may be provided for connecting the armature 26 to the supply conductors 40 and 42, so as to control the direction of current flow therethrough.

In order to reduce the current drawn by the motor 24 at the moment of starting, a current limiting resistance 43 may be connected in series circuit relation with the armature 26. A suitable time delay relay 44, of any well-known type, having a damper winding about the armature, may be provided for cutting the resistance 43 out of the armature circuit a predetermined time after starting. For example, the relay 44 may be provided with normally closed contact members 44a connected to provide a shunt circuit about the resistance 43, and an operating winding 45 which may be energized to effect immediate operation of the relay to insert the resistance 43 into the armature circuit. A predetermined interval after deenergization of the winding 45, the relay returns to the deenergized position and again shunts the resistance 43 out of the armature circuit.

The field winding 28 of the motor may be provided with a suitable current controlling rheostat 46 for manually controlling the field current so as to permit the operator to vary the speed of the motor as desired. With a view to automatically controlling the speed of the motor 24, suitable means may be provided for automatically varying the field current of the motor. For example, an adjustable current limiting resistance 47 may be connected in series circuit relation with the field winding 28 of the motor, and suitable means, such as the field switch 48, provided for shunting a portion of the resistance in order to increase the field current and reduce the motor speed. In addition, suitable means such as the adjustable resistance 50 may be provided, having a field switch 52 for connecting it in shunt circuit relation with the field winding 28 so as to reduce the field current and increase the motor speed from a predetermined normal value.

In order to manually control the operation of the feed motor 24, manually operated control switches 54 and 56 may be provided for controlling the energization of the operating windings 58 and 60 of the field switches 48 and 52, respectively. Manually operable "forward" and "reverse" switches 62 and 64 may be provided for controlling the energization of the operating windings 66 and 68 of the armature switches 36 and 38, respectively, in a similar manner, so as to provide for manually controlling the direction of operation of the feed motor 24. Suitable means, such as, for example, the master control switch 70 may be provided for connecting the control bus 71, from which the manually operated switches are energized, to the supply conductor 42 when it is desired to manually control the operation of the feed motor.

In order to control the operation of the feed motor 24 in accordance with the conditions in the electrode circuit so as to provide a sensitive and efficient electrode control system, suitable means such as, for example, the regulator 72 may be provided for controlling the operation of the field switches 48 and 52 so as to vary the speed of the feed motor 24 in accordance with the current and voltage conditions of the electrode circuit. For example, the regulator 72 may comprise a movable contact arm 74 pivotally mounted intermediate the armatures 76 and 78 for actuating relatively movable contact members 72a and 72b. Operating windings 80 and 82 may be provided for actuating the armatures 76 and 78, respectively.

The operating winding 80 may be energized in accordance with voltage conditions of the arc by being connected across the conductors 21 and 22 which connect the electrode 10 and the cupola 14 in which the work 12 is positioned to the source of current. The operating winding 82 may be energized in accordance with current conditions in the electrode circuit by connecting it to the terminals of a current transformer 84, the primary winding of which is connected in series circuit relation in the electrode circuit. Suitable means may be provided for varying the realtive energization of the voltage and current windings 80 and 82 of the regulator 72 in order to adjust it to maintain predetermined arc conditions. For the purpose of adjusting the relative energization of the current and voltage windings, an adjustable resistor 88 may be connected so as to vary the current through the current winding 82. By suitably connecting the regulator 72 to control the energization of the operating windings 58 and 60 of the field switches 48 and 52, the speed of the feed motor 24 may be varied in accordance with changes in the current and voltage conditions of the electrode circuit.

In order to provide for automatically reversing the direction of feed of the electrode 10, suitable means such as, for example, the current responsive relay 89 may be provided. The operating winding 90 of the relay 89 may be connected in series circuit relation with the current winding 82 of the regulator 72 so as to be energized in accordance with the current in the electrode circuit. By suitably connecting the contact members 89c, 89e and 89d of the current responsive relay 89 in the energizing circuits of the operating windings 66 and 68 of the armature switches 36 and 38, respectively, the direction of operation of the feed motor 24 may be controlled so as to reverse the direction of electrode feed when the current in the electrode circuit exceeds a predetermined value.

By providing the current responsive relay 89 with additional contact members 89b and 89a, the energization of the operating widings 58 and 60 of the field switches 48 and 52, respectively, may also be controlled, so as to provide for the operation of the feed motor 24 at a relatively high speed when the current responsive relay 89 is operated in accordance with excessive current in the electrode circuit, so as to insure a rapid withdrawal of the electrode 10 from the work and facilitate the immediate establishment of the desired arc conditions.

Suitable control means may be provided for effecting automatic control of the electrode feed. For example, an electro-responsive master control switch 91 may be provided for connecting the control bus 71 to the conductor 42. A "start" pushbutton switch 92 and a "stop" pushbutton switch 93, may be provided for controlling the energization of the operating winding 94 of the master control switch 91, to connect and disconnect the control system to and from the supply conductors.

If it is desired to manually control the feed of the electrode 10, the master control switch 70 is operated to close contact members 70a and open contact members 70b, thus connecting the control bus 71 to the supply conductor 42. Since there is no current flowing in the electrode circuit and only the voltage winding 80 of the regulator 72 is energized, the contact arm 74 of the regulator 72 will be in such a position that the contact members 72b are closed, thus providing an energizing circuit for the operating winding 60 of the field switch 52 through the circuit from the supply conductor 42, through contact members 70a, the control bus 71, resistor 95, normally closed contact members 56a, conductor 96, closed contact members 72b, conductor 97, operating winding 60, and conductor 98 to supply conductor 40. Operation of the field switch 60 provides a shunt circuit about the field winding 28, through the resistance 50 and contact members 52a, thus weakening the motor field so that when the motor is started it will feed the electrode toward the work at a relatively high rate of speed.

Upon operation of the master control switch 70, the operating winding 45 of the time delay relay 44 is also energized through the circuit which may be traced from the supply conductor 40, through conductor 100, conductor 102, operating winding 45, normally closed contact members 38c and 36c, to the control bus 71. The time delay relay operates to open normally closed contact members 44a and insert the resistance 43 in the armature circuit and close contact members 44b.

By operating the "forward" manual control switch 62, an energizing circuit may be provided for the operating winding 66 of the armature switch 36, through the circuit extending from the control bus 71, conductor 104, contact members 44b, conductor 105, contact members 62b, contact members 64a, conductor 106, contact members 32b, conductor 108, contact members 89c, conductor 110, operating winding 66, conductor 102, and conductor 100 to the supply conductor 40. The armature 26 of the motor is thereby connected by means of the contact members 36a and 36b across the supply conductors 40 and 42, and the feed motor 24 operates to feed the electrode 10 in the direction of the work 12 at a rate determined by the setting of the manually operated field rheostat 50 and the adjustable resistance 47. A holding circuit is provided for the operating winding 66 through contact members 36d.

As soon as the electrode 10 engages the work 12, a relatively large current flows in the electrode circuit so that the current responsive relay 89 operates, deenergizing the operating winding 66 of the armature switch 36 by opening contact members 89c. The armature switch 36 returns to the deenergized position and the operating winding 45 of the time delay relay 44 is thereby energized through contact members 36c and 38c so that the relay operates, completing an energizing circuit for the operating winding 68 of the armature switch 38 through the normally open contact members 89d of the current responsive relay 89 and the normally open contact members 44b of the time delay relay. The armature switch 38 operates and the armature 26 is thereby connected across supply conductors 40 and 42 through contact members 38a and 38b so that the direction of current flow therethrough is reversed and the electrode feed motor 24 thus operates to reverse the direction of electrode feed so that an arc is drawn between the electrode 10 and the work 12.

Subsequent control of the electrode may be effected manually, if desired, by operation of the "forward" control switch 62 to effect forward feed of the electrode 10 and thereafter controlling the rate of feed by operating the control switches 54 and 56 which control the field switches 48 and 52 to obtain the desired rate of feed, or the operation of the feed motor may be transferred to automatic control by closing the "start" pushbutton switch 92 and opening the master control switch 70 to the position shown.

If desired, complete control of the electrode 10 may be effected automatically by operating the master control switch 70 to open contact members 70a and close contact members 70b, as shown, and closing the "start" pushbutton switch 92. An energizing circuit is thereby provided for the operating winding 94 of the master control relay 91 for operating the relay to connect the control bus 71 to the supply conductor 42, through the contact members 91b. Auxiliary contact members 91a may be provided in shunt circuit relation with the "start" pushbutton switch 92 to provide a holding circuit for the operating winding 94 of the master control relay.

Upon the connection of the control bus 71 to the supply conductor 42, the field winding 28 of the feed motor 24 is energized. The operating winding 45 of the time delay relay 44 is also energized and the relay operates to insert the starting resistance 43 in the armature circuit and close contact members 44b. Since there is no current flowing in the electrode circuit at this time, the current responsive relay 89 is in the deenergized position so that an energizing circuit is provided for the operating winding 66 of the armature switch 36, through the circuit extending from the control bus 71, through conductor 104, contact members 44b, conductor 105, conductor 118, contact members 70b, conductor 120, contact members 89e, conductor 122, contact members 64a, conductor 106, contact members 32b, conductor 108, contact members 89c, conductor 110, operating winding 66, conductor 102, and conductor 100 back to supply conductor 40. The switch 36 operates, thus connecting the armature 26 across the supply conductors 40 and 42.

When the electrode circuit is deenergized, the contact arm 74 of the regulator 72 is in such a position that the contact members 72b are closed for providing an energizing circuit for the operating winding 60 of the field switch 52, extending from the supply conductor 40 through conductor 98, operating winding 60, conductor 97, contact members 72b, conductor 96, contact members 56a, resistor 95 and control bus 71 to conductor 42. The field switch 52 thus operates to reduce the field current of the feed motor 24 so that the electrode 10 is fed towards the work 12 at a relatively high speed.

Upon the engagement of the electrode 10 with the work 12, a relatively high current flows in the electrode circuit so that the regulator 72 operates to open contact members 72b and to close contact members 72a. At the same time, however, the current responsive relay 89 operates, interrupting the energizing circuit of the operating winding 66 of the armature switch 36 by opening contact members 89c and providing an energizing circuit for the operating winding 68 of the armature switch 38 in a manner hereinbefore described. The connections of the armature 26 to the supply conductors 40 and 42 are thereby reversed, so that the feed motor 24 reverses to withdraw the electrode 10 from the work 12, thus striking an arc.

By providing the current responsive relay 89 with normally open contact members 89a, connected in shunt circuit relation with the contact members 72b of the regulator 72, and normally closed contact members 89b connected in series circuit relation with the contact members 72a of the regulator, the field switches 48 and 52 may be operated under the control of the current responsive relay 89 during reversal of the electrode feed, instead of under the control of the regulator 72.

By connecting the auxiliary contact members 89a and 89b in this manner, the operating winding 60 of the field switch 52 will be energized during the reversal of the electrode feed, and the operating winding 58 of the field switch 48 will be deenergized. Thus, the feed motor 24 will operate at a relatively high speed to withdraw the electrode 10 from the work 12 so as to facilitate rapid establishment of the proper arc conditions.

When the arc current is reduced to the predetermined value required for the operation of the current responsive relay 89, the relay returns to the deenergized position, and provides for the energization of the operating winding 66 of the armature switch 36 and the deenergization of the operating winding 68 of the armature switch 38 in a manner hereinbefore described in detail, so that the feed motor 24 is then operated to feed the electrode in the direction of the work.

While the electrode 10 is fed in the direction of the work 12, the regulator 72 operates to control the field switches 48 and 52 so as to vary the speed of the feed motor in accordance with the current and voltage conditions of the arc. If the arc is longer than a predetermined suitable value, the arc voltage will be greater than normal and the arc current less than normal. The energization of the voltage winding 80 of the regulator is therefore increased, and at the same time, the energization of the current winding 82 is decreased. As the changes in the pulls exerted by the two windings effected by the changes in both of these conditions are additive in actuating pivoted contact arm 74, sensitive operation of the regulator 72 is thereby secured. The contact member 70a is closed, completing an energizing circuit for the operating winding 60 of the field switch 52 so that the speed of the feed motor 24 is increased, in an effort to reduce the length of the arc to the desired value.

If the length of the arc becomes less than the normal predetermined value, the voltage of the arc decreases, and the arc current increases. The relative energization of the voltage winding 80 and the current winding 82 of the regulator 72 is thereby reversed so that the contact arm 74 is actuated in the reverse direction and the contact members 72a are opened and the contact members 72b are closed. The energizing circuit for the operating winding 60 of the field 52 is thereby interrupted, and an energizing circuit is provided for the operating winding 58 of the field switch 48, so that the speed of the feed motor 24 is decreased, thus permitting the electrode to melt and lengthen the arc.

When the arc length is of the desired length, the contact members 72a and 72b are both open and the field switches 48 and 52 are both deenergized. The feed motor 24 then operates at a predetermined speed determined by the adjustment of the resistance 47 and the manual field rheostat 46.

From the above description and the accompanying drawing, it will be realized that I have, by my invention, provided a simple and effective manner for controlling the rate of feed and the direction of feed of a movable electrode for an arc furnace, a welding operation, or other similar application. By controlling the rate of feed in accordance with both the current and voltage conditions of the electrode circuit in the manner hereinbefore described, sensitive and accurate control of the arc length is obtained. By providing for controlling the direction of electrode feed in accordance with predetermined current conditions, rapid establishment of the arc is easily secured. Operation of the actuating means may be readily transferred from manual to automatic control at the will of the operator, thus providing a complete and practical control system which is simple and flexible to operate and inexpensive to maintain.

Since certain changes may be made in the above description, and different embodiments of the invention may be made without departing from the spirit thereof, it is intended that all the matter contained in the above description or shown in the accompanying drawing shall be considered as illustrative, and not in a limiting sense.

I claim as my invention:

1. The combination with an electrode circuit having a movable electrode with a reversible variable speed feed motor operatively connected therewith for feeding the electrode, of control means for selectively increasing or decreasing the speed of the feed motor from a predetermined normal value, regulating means having current and voltage responsive means energized from the electrode circuit for operating the control means, electro-responsive means operable to control the direction of rotation of the feed motor, and a current responsive relay operable when the current in the electrode circuit exceeds a predetermined value to effect the operation of the electro-responsive means and control means to reverse the direction of rotation of the feed motor and render the regulating means inoperative.

2. A control system for electrode actuating means adapted to feed a movable electrode at varying rates and in opposite directions for striking and maintaining an arc comprising, control means responsive to predetermined arc current and voltage conditions, manually operable switch means, electro-responsive switch means operable under the control of the control means or the switch means to determine the rate of operation of the electrode actuating means, and means responsive to current conditions of the arc for controlling the direction of operation of the electrode actuating means.

3. The combination with an electrode circuit having a movable electrode with a reversible feed motor capable of varying speed operatively connected thereto for feeding the electrode, of switch means operable to increase the speed of the motor above a predetermined value, additional switch means operable to decrease the speed of the motor below the predetermined value, and control means differentially responsive to current and voltage conditions in the electrode circuit for controlling the operation of the said switch means to vary the rate of electrode feed from the predetermined normal in one direction to maintain predetermined current and voltage conditions in the circuit, and relay means controlling the feed motor and the switch means operable to reverse the direction of electrode feed when the current exceeds a predetermined value.

4. A control system for a movable electrode adapted to maintain an electric arc and having a reversible variable speed feed motor operatively connected thereto, of manually operable switch means, control means having a current winding energized in accordance with the arc current and an opposing voltage winding energized in accordance with the arc voltage, electro-responsive means controlling the speed of the feed motor to increase or decrease it from a predetermined normal speed, and control switch means for selectively placing the electro-responsive means under the control of the manual switch means or the control means.

5. The combination with a movable electrode adapted to maintain an arc, of a reversible variable speed motor operatively connected to feed the electrode at a predetermined normal rate in said one direction, regulating means responsive to current and voltage conditions of the arc to vary the speed of the feed motor to feed the electrode at a different rate in said one direction, and means responsive to predetermined arc current conditions for controlling the feed motor to reverse the direction of electrode feed and increase the rate above the normal.

6. An electrode feeding system comprising, a movable electrode, an electrode circuit for connecting the electrode to a source of current, reversible variable speed actuating means for feeding the electrode to produce and maintain an arc in the electrode circuit, control means responsive to current and voltage conditions of the electrode circuit for controlling the actuating means to vary the rate of feed of the electrode, and means responsive to predetermined current conditions for controlling the actuating means to reverse the direction of electrode feed and rendering the control means inoperative.

7. A control system for a movable electrode adapted to produce an arc in an electrode circuit and having reversible variable speed feed means operatively connected therewith to feed the electrode comprising, control means operable to selectively increase or decrease the speed of the feed means from a predetermined value, regulating means responsive to current and voltage conditions of the electrode circuit for controlling the control means to vary speed of the feed means to vary the rate of electrode feed from a predetermined normal value in one direction in accordance with arc conditions, and current responsive means operable when the current in the electrode circuit exceeds a predetermined value to effect the feed of the electrode in the reverse direction at an increased speed.

8. An electrode system comprising, a movable electrode for producing an electric arc, reversible variable speed actuating means operatively connected to feed the electrode, speed control means for varying the speed of the actuating means to vary the rate of electrode feed in one direction, regulating means responsive to current and voltage conditions of the arc controlling the speed control means, switch means for controlling the speed control means, additional switch means for selectively placing the speed control means under the control of the regulating means or the switch means, and means responsive to predetermined arc current conditions for controlling the actuating means to reverse the direction of electrode feed and render the regulating means inoperative.

CYRIL C. LEVY.